3,734,901
DEFATTED SOYBEAN FRACTIONATION BY SOLVENT EXTRACTION
Lester P. Hayes and Ross P. Simms, Decatur, Ill., assignors to A. E. Staley Manufacturing Company, Decatur, Ill.
Filed Sept. 28, 1970, Ser. No. 75,933
Int. Cl. A23j 1/14
U.S. Cl. 260—123.5                                     25 Claims

ABSTRACT OF THE DISCLOSURE

Soya protein concentrates are prepared by removing residual lipid and water-soluble constituents from defatted soybean flakes. The residual lipids are initially extracted from the soybean flakes with a hydrocarbon/monohydric alcohol solvent followed by aqueous extraction of the water-soluble constituents. A high lecithin-containing oil is obtained by admixing the resultant lipid miscella and aqueous miscella and then effectuating an oil phase separation from the admixture.

DISCLOSURE OF THE INVENTION

Figure 1:
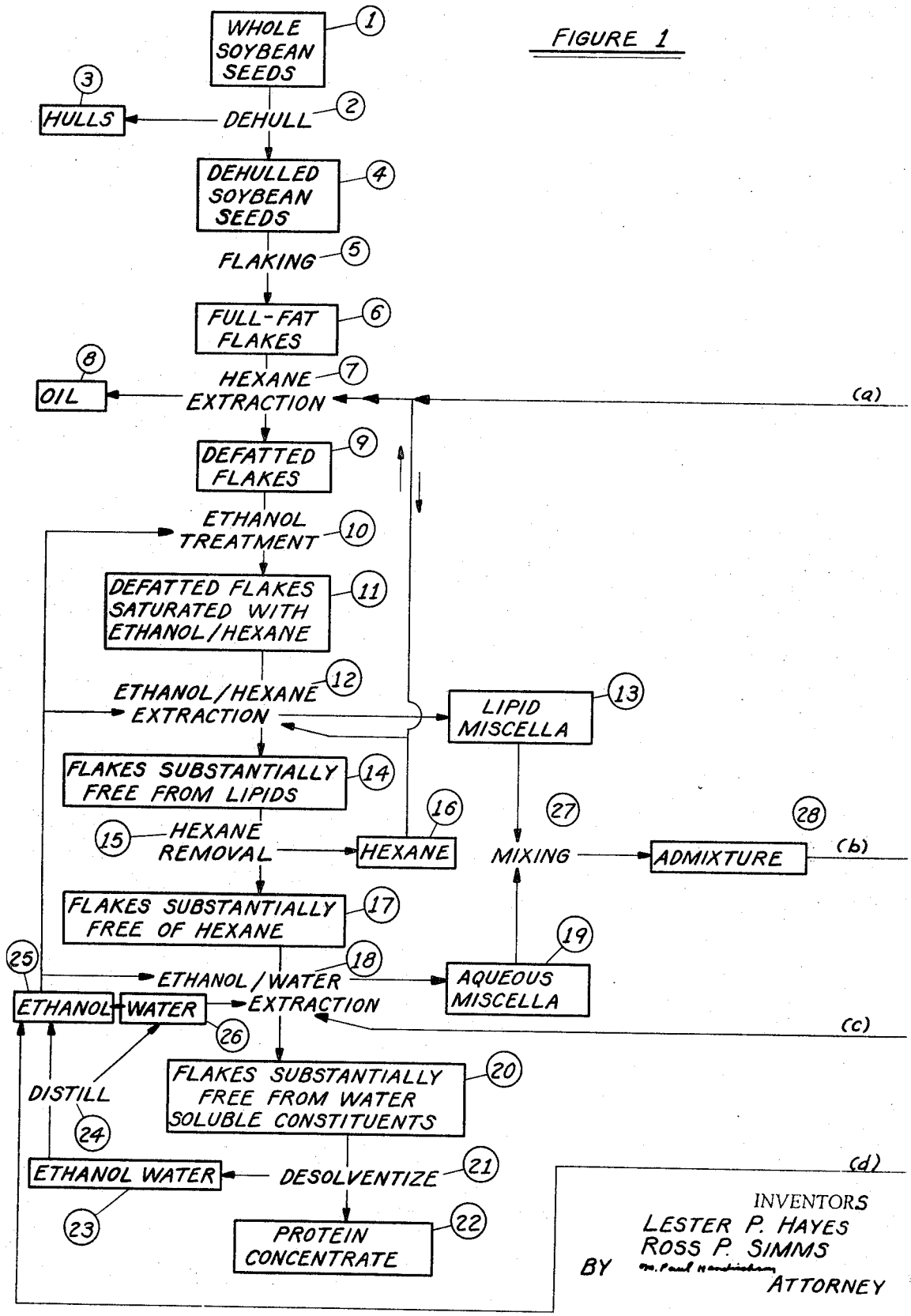

This invention relates to the processing of seeds and the recovery of unique products therefrom. More particularly, the invention relates to a process for obtaining high quality seed oils and protein concentrates having greater utility in the food industry.

It is well known to the art that the composition of dehulled soybean seeds will vary depending upon numerous factors such as maturity, soil, culture and climatic conditions, environmental factors, etc. The various constituents of dehulled soybeans have been classified as lipid extracts, water-soluble extracts and residual constituents.

In general, the residual constituents of soybean seeds are insoluble in aqueous alcohol and non-polar solvent systems. Such residual constituents consist essentially of soya protein and high molecular weight polysaccharides. In general, the residual constituents comprise about 55% to about 65% by weight of the total dehulled soybean seed weight. Normally the residual constituents of a commercial grade of dehulled soybean seed are about 60% of its total solids weight. Based on the total dry weight, dehulled soybeans broadly contain from about 35% to about 60% by weight protein with most commercial varieties possessing about 40% to about 45% by weight protein. The residual fibrous constituents in soybeans broadly comprise about 2% to about 7% of its total dry weight, with most commercially available dehulled soybean seeds having a total fiber content ranging from about 2 to about 4 weight percent.

The lipid constituents of soybean seeds are conventionally defined as a composite of lipid materials extractable from ground or flake soybeans with organic solvents such as petroleum naphthas, diethylether, hexane, the chlorinated hydrocarbons, etc. Broadly, the amount of lipid material found in dehulled soybean seeds ranges from about 15% to about 30% of its total dry weight with most commercially available lots ranging from about 22% to about 24% by weight lipid material. About 90% to 95% of the total lipid extractable constituents of dehulled soybean seeds is fatty acid glycerides, with the remainder thereof being minor components of both saponifiable and unsaponifiable constituents. In addition to the fatty triglycerides, the saponifiable components of dehulled soybean consists essentially of phosphatides and free fatty acids which respectively comprise about 0.25 to about 1.0% and about 0.1 to about 0.5 weight percent of the total dehulled soybean solid weight. The unsaponifiable fractions of the lipids contained in soya beans represents a small proportion of the total lipids and comprises a diversity of components such as oil-soluble pigments, vitamins, sterols and tocopherols. This unsaponifiable fraction includes as a class the hydrocarbons, aliphatic and cyclic alcohols, phenols, ketones and relatively unsaponifiable constituents such as waxes, phytosterolins, vitamin esters, etc.

The aqueous alcohol soluble constituents of dehulled soybean seeds broadly range from about 10% to about 20% of its total dry weight with most commercial grades of dehulled soybean seeds being at about 15%. Illustrative water-soluble constituents of dehulled soybean seeds are the di-, tri-, and tetrasaccharide sugars (e.g., stachyose, raffinose, and sucrose); glucosides such as the phytosterols (sterol glucosides), the saponins and isoflavone glucosides; organic phosphorus compounds (phytin); organic acids, etc. Polysaccharides having two or more saccharides are the principal constituents of the nitrogen free (i.e., non-proteinaceous) aqueous alcohol extracts normally found in the soybean seed.

Heretofore soybean oil has been the most valuable commercial product obtained from soybeans. It has become conventional to extract the oil from soybean particulates (e.g., flakes or granules) with a petroleum hydrocarbon solvent such as hexane. The extraction process recovers approximately 90% to 95% of the total soybean oil content with the remaining portion thereof remaining in the defatted soybean as residual lipid material.

The defatted soybean meal is used extensively as an animal feed ingredient. Since the defatted soybean meal possesses a high concentration of relatively balanced amino acids, its use as a protein food source would be highly desirable. However, utility of defatted soybeans as a human food ingredient has been seriously limited by several inherent adverse properties. One of the most important potential uses for defatted soybean meals pertains to its application in preparing dry expanded extrudates, commonly known as texturized vegetable proteins. Such texturized extrudates have been useful in preparing synthetic meat analogs. Unfortunately, the presence of both the residual lipids and water soluble constituent contaminants significantly alters the textural and organoleptic properties of the protein and meat analogs prepared therefrom. To obviate this problem, the art has resorted to costly processes to prepare protein isolates for use as an extrudate protein source or spun filament type proteins such as disclosed in U.S. Pat. No. 2,682,466 by Boyer. Despite a considerable amount of effort, time and money to eliminate these adverse properties, conventional defatted soybean meals still possess a latent potential which from both a technological and economical viewpoint could far exceed the value of the oils extractable therefrom.

Conventional defatted soybean meals are contaminated with a significant amount of residual lipids ranging from approximately 0.5% to about 5.0% of its total dry weight as ascertained by AOCS Official Method AC 3–44 (Official Method of American Oil Chemist Society). If it were technologically and economically feasible, it would be highly desirable to remove residual lipids. Removing residual lipids from soybean meals is desirable for several diverse reasons. The residual lipids are primarily composed of the fatty constituents of a high lecithin soybean oil having a relatively high market value. In addition to the marketability of a high grade lecithin oil, the presence of residual lipids in the soybean meals has an adverse effect upon its potential food use. Conventional solvent extracted soybean meals possess a "beany" flavor (associated with residual lipids) which seriously limits its use as a protein replacement in the food industry. The residual lipids significantly reduce the defatted soybean meals' hydration character and also impart thereto an undesirable color (e.g., partially due to the presence of oil soluble pigments). Stability of the of the soybean meal (e.g., against oxidative rancidity and color changes) is also adversely affected by the presence of the residual lipids. Moreover, the residual lipids have an adverse effect upon the protein gel and whipping properties of the soya protein. Employment of conventional defatted soybean flakes in preparing dry expanded extrudates for use as a meat analog is also frustrated because residual lipids negate the desired organoleptic character of the texturized soya protein. For these reasons, it would be highly advantageous to remove the residual lipids from conventionally defatted soybean meals.

In addition to containing residual lipid, defatted soybean meals contain substantially all of the water-soluble constituents of the native dehulled soybean seeds. Similar to the residual lipids, the water-soluble constituents substantially reduce the potential usefulness of defatted soybean flakes. Water-soluble pigments and pigments removable therefrom with aqueous solvents impart an undesirable color. The aqueous alcohol solubles have a distinctive bitter taste which is effectively removed pursuant to this invention. Similar to residual lipids, the water-soluble constituents limit functionality of the soybean meal as a protein replacement. The water-solubles adversely affect desirable protein characteristics such as its hydration, water-solubility, gel formation, whipping properties and the like. The presence of these water-soluble constituents also substantially reduce the protein concentration of the soybean meal. In combination with the residual lipid contaminants, the water soluble constituents further compound the adverse organoleptic characteristics of texturized vegetable proteins prepared from defatted soybean meal.

In U.S. Pat. 3,365,440 by Circle et al., there is disclosed a method of removing water-soluble constituents from "defatted" soybean flakes to provide a soybean protein isolate. Pursuant to the Circle et al. teachings, defatted soybean flakes (obtained from conventional hexane solvent extraction processes and containing a significant amount of residual lipid materials) are extracted with a protein immobilizing, water-miscible organic solvent to remove the water-soluble solids therefrom. Although the Circle et al. method allegedly removes substantially all of the water-soluble constituents from "defatted" soybean flakes, the method and products prepared therefrom possess inherent disadvantages. The method does not effectively remove the residual lipids normally contained in commercial lots of hexane extracted soybean flakes. These residual lipids have been found to adversely affect extraction of the water-soluble constituents therefrom. Furthermore, the Circle et al. teachings are primarily directed to removal of water-soluble constituents from "defatted" soybean flakes. Unfortunately, the residual lipid materials of soybean flakes are also a significant factor and have a pronounced effect upon the characteristics and nature of the soya protein. These resultant lipids contain oil soluble pigments, malodorous and flavor matter (e.g., those lipids responsible for "beany" flavor), and other lipid contaminants which adversely affect its hydration, whipping and protein gel properties. Since the Circle et al. patent does not effectively extract the residual lipids, the process fails to provide a means for recovering a high lecithin oil from defatted soybean flakes.

An analytical method for removing and identifying phosphatides from soybeans has been disclosed by Neilsen, Kaj, in the Journal of the American Oil Chemists Society, 37, 217–19, 1960, in a publication entitled "The Composition of the Difficultly Extractable Soybean Phosphatides." The phosphatides are extracted with a mixture of 80% by weight of hexane and 20% by weight of absolute ethanol. The analytical method removes substantially all of the remaining phosphatides along with other fatty residues from hexane-extracted soybean flakes without removing the water-soluble constituents from the soybean flakes.

Notwithstanding a long-felt need, the commercial processing of soybeans has remained relatively unchanged for three decades. Commercially, the hexane-extracted lecithin and oil have remained the predominant commercial product with the defatted soybean flakes, being primarily an ancillary feed ingredient. Commercially valuable residual lecithin and soybean oil has been allowed to remain in the soybean flakes because an economical means for its recovery has not been found. For similar reasons, the potential usefulness of the protein portion of the soybean flakes has failed to reach its full potential utility.

An object of the present invention is to provide a process for obtaining a high-grade seed oil from solvent-extracted oil seed material.

Another object of the invention is to provide a process for preparing enriched seed proteins possessing improved properties.

An additional object of the invention is to provide an efficient and economical process for removing adverse contaminants from solvent-extracted oil seed proteinaceous materials.

Figure 2:
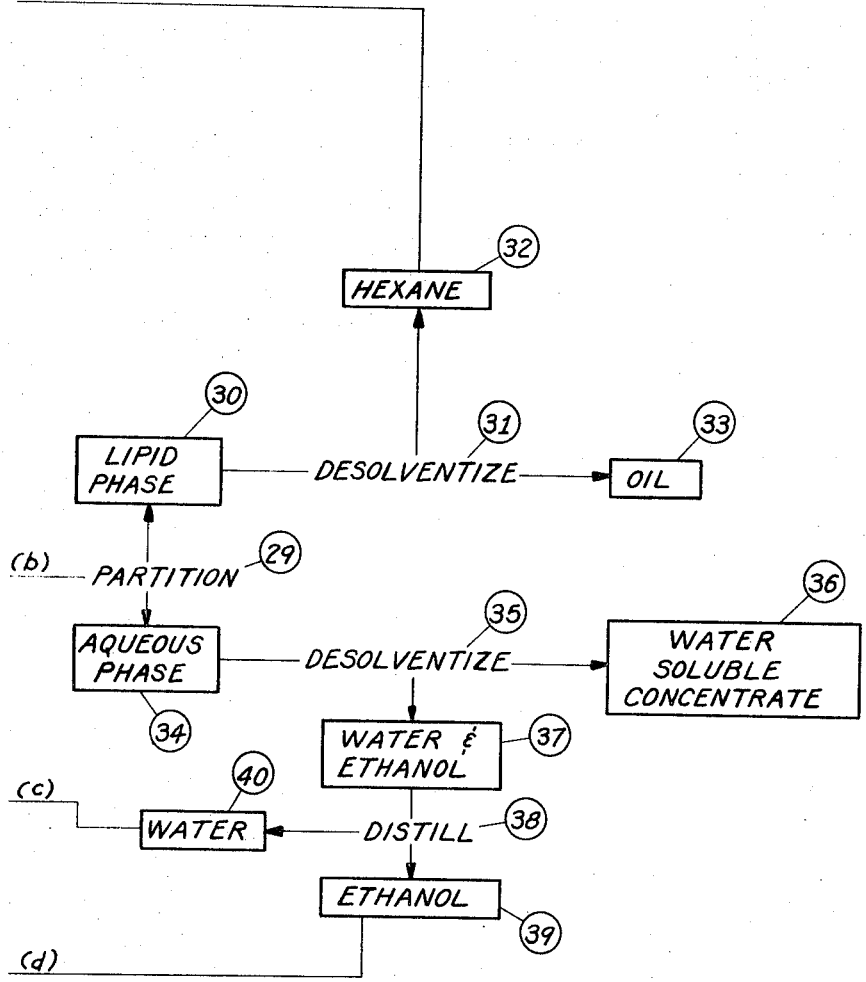

The invention is illustrated in the attached drawings, of which:

The FIGS. 1 and 2 represent a schematic flow diagram of an integrated process for recovering soya protein, residual lipid and water-soluble concentrates pursuant to the present invention.

According to the present invention, there is provided a process for removing and separating residual lipids and water-soluble constituents from solvent-extracted seed proteinaceous materials and providing seed protein concentrates therefrom, said process comprising the steps of:

(a) Extracting residual lipid constituents from a solvent-extracted seed proteinaceous material which contains on a dry weight basis from about 0.5 to about 10% lipids, from about 25% to about 40% water-soluble constituents with the remaining portions thereof being primarily protein and a minor amount of fiber, said lipid constituents being extracted from the solvent-extracted seed material by subjecting 100 parts by weight of the material to a lipid extraction medium containing a hydrocarbon solvent and at least 2 parts by weight to about 30 parts by weight monohydric alcohol for each 80 parts by weight hydrocarbon solvent, said extraction of lipids being conducted under conditions whereby the amount of alcohol is maintained at a level of at least 2% to about 40% of the seed material dry weight;

(b) Separating the resultant lipid miscella from the residual seed material;

(c) Extracting at least a major portion of the water-soluble constituents contained in the residual seed material by subjecting 100 parts by weight of the residual composition to about 150 to about 300 parts by weight aqueous extraction medium containing at least 40% but less than 70% by weight aliphatic monohydric alcohol;

(d) Separating the resultant aqueous miscella from the seed material and thereby providing a seed protein concentrate;

For maximum advantage in the present invention, the residual lipids are subjected to the additional recovery steps, that is, treatments of the lipid miscella and the aqueous miscella that are separated from the solvent-extracted oil seed proteinaceous material as hereinbefore described. In general, this process of recovering marketable residual lipids comprises the additional steps of:

(e) Admixing together the lipid miscella and aqueous miscella and effectuating a phase separation of the resultant admixture to provide a non-polar phase containing substantially all of the lipid extracts and polar phase containing substantially all of the water-soluble extracts, with the total amount of monohydric alcohol contained within the resultant admixture being sufficient to provide a polar phase containing at least 40% but less than 70% by weight of the total polar phase weight;

(f) Separating the non-polar phase from the polar phase and recovering the respective lipid concentrates and water-soluble concentrates therefrom.

The process of the present invention is adapted to recovery of residual lipids, water-soluble constituents and vegetable seed protein concentrates to proteinaceous seed materials obtained by solvent extraction of oil seeds such as cottonseed, safflower, sunflower, peanuts, sesame, soybeans and the like which have a protein concentration of at least 30% on a dry weight basis. The process is particularly adapted to soya compositions. The following disclosure illustrates the processing of soya compositions although it should be understood that other solvent-extracted oil seed proteinaceous materials may be substituted therefor.

Suitable soya compositions for the process include soya compositions having an appropriate extraction surface area (e.g., granules of less than 20 mesh particle size or flakes) wherein a substantial portion of the total native lipid material has been removed by conventional solvent extraction (e.g., about 50% by weight or more). Particularly suitable soya compositions are defatted soybean flakes obtained from commercial petroleum solvent extraction processes (e.g., hexane extracted) which contain residual lipids along with substantially all of the water-soluble constituents, fibrous and proteinaceous material of the native soybean seed. The residual lipids of the defatted soya composition may broadly range from at least .5% to about 10% of its total solids weight as ascertained by AOCS—Official Method AC 3-44 with a residual lipid content of about 0.5% to about 1.5% being most common. In the recovery of residual lipids, the lipid composition (e.g., the amount of oil and lecithin and proportions thereof) can be conveniently controlled by the amount of lipids in the soya composition employed as a source material. Thus by employing a soya composition of a predetermined residual lipid content, recoverable lipids to fit a specific purpose or composition can conveniently be prepared pursuant to the invention. These residual lipids consist primarily of fatty acid glycerides along with minor components of both saponifiable and unsaponifiable lipids. The phosphatides comprise approximately 30 to 80 weight percent of the total residual lipids.

In the process, defatted soybean flakes having a hexane content of 0% to about 100% of the total solids weight are suitably employed as a raw material for the residual lipid extraction step. Since the extraction of the residual lipids from the soya composition necessitates the employment of a hydrocarbon-alcohol solvent extraction step, it is advantageous to utilize a soya composition already saturated with a hydrocarbon solvent. In a commercial process, a soya composition saturated with hydrocarbon (preferably hexane) can be directly obtained after the conventional solvent-extraction process by omitting, or at least not completing, desolventizing. In the residual lipid extraction step, defatted soybean flakes having a hydrocarbon solvent to solid full fat soybean flake weight ratio about 1:1 to about 1:3 are advantageously employed. Since the present invention is most suitably employed in conjunction with a conventional hydrocarbon solvent extraction process, unless expressly stated otherwise, all solids weights in the residual lipid and aqueous soluble extraction steps are based upon the solid weight of dehulled soya compositions prior to removal of lipids or oils therefrom (e.g. full fat soybean flake weight). When defatted soybean flakes saturated with a hydrocarbon are employed, the total amount of hydrocarbon solvent required in the lipid extracting step is proportionally reduced to compensate for that already provided by the saturated soybean flakes.

If soya compositions saturated with a hydrocarbon solvent are employed, significantly improved extraction rates and more efficient solvent use are achieved by initially treating the soya composition with either a relatively pure monohydric alcohol or a lipid extracting medium wherein at least a major portion of the medium (on a weight basis) is a monohydric alcohol. Such an initial pretreatment of the hydrocarbon saturated soya composition with a monohydric alcohol results in a penetration and removal of the hydrocarbon from the interstices of the soya composition or flakes. The initial pretreatment enables the monohydric alcohol to function as a wetting agent, thus facilitating the removal of residual lipids therefrom. If the solventized flakes are pretreated with monohydric alcohol, the total amount of monohydric alcohol in the lipid extraction medium is accordingly adjusted to provide the appropriate balance of soybean flake, hydrocarbon and monohydric alcohol in the lipid extraction medium.

Pursuant to the present process, the residual lipids are extracted from soya compositions with a hydrocarbon/monohydric alcohol extraction medium. The lipid extraction medium is comprised of a hydrocarbon solvent and at least 2 parts by weight to about 30 parts by weight monohydric alcohol for each 80 parts by weight of the hydrocarbon solvent. The total amount of lipid extraction medium necessary in extracting the residual lipids depends primarily upon the soya composition solids weight and the monohydric alcohol concentration. The total amount of monohydric alcohol should be at least 2% to about 40% alcohol of the total soya compositions solids weight. Enhanced extraction rates and the ability to remove significantly greater concentrations of the residual lipid material contained within the soybean composition is accomplished when the amount of monohydric alcohol employed ranges from about 8 to 25 parts by weight monohydric alcohol for each 80 parts by weight hydrocarbon solvent with the amount of alcohol ranging from 5% to 25% of the soya composition solids weight. The solvent to soybean flakes weight ratio under such conditions will normally range from about 0.85:1 and 1.35:1. Significantly greater rates of extraction and effectiveness in removing the lipids is accomplished when in the lipid extraction medium solvent the amount of monohydric alcohol ranges from about 10% to 20% of the soya composition solids weight (usually at an extraction solvent: composition weight ratio of about 1:1 to about 4:3).

Illustrative monohydric alcohols employed herein include aliphatic monohydric alcohols of from 1 to 4 carbon atoms such as methanol, ethanol, isopropanol, n-propanol, and butanol, isobutanol, n-butanol and mixtures thereof. When ethanol is employed as a monohydric alcohol, significantly greater recovery of residual lipids from the soybean flakes, increased effectiveness in the removing residual lipids coupled with improved processed products are accomplished. Typical hydrocarbon solvents include those conventionally utilized in defatting soybean flakes. Typical hydrocarbons employed herein are hexane, n-heptane, naphthas consisting essentially of relatively pure paraffins of very narrow boiling range, the heptane-type napthas, mixtures thereof and the like. Normal hexane in the combination with ethanol is particularly suitable as a solvent for the extraction of the residual lipids from the soya composition.

The residual lipid extraction step is conducted at any temperature between the freezing and boiling points of the solvent mixture (i.e., under conditions wherein solvent is liquid). In order to maximize the rate of extraction, reduce equipment and processing costs and increase the lipid yields, elevated temperatures are generally employed. Advantageously, the temperature of the residual lipid extraction medium ranges from about 100° F. to the boiling point of the solvent mixture. In extracting the residual lipids, the preferred temperature is about the reflux temperature of the lipid extraction medium (e.g., normally 100° F. to about 140° F.).

In the extraction of the residual lipid materials from defatted soybean compositions, the monohydric alcohol does not function solely as a co-solvent. Rather, the monohydric alcohol functions as a wetting agent expediting the release of lipids from the protein-carbohydrate complex. This co-action enables the hexane to more effectively solubilize the residual lipids. Thus, the monohydric alcohol promotes and enhances the solvent properties of the hydrocarbon. If the concentration of monohydric alcohol in the solvent mixture is too great (e.g., greater than 70%), a substantial amount of non-proteinaceous matter including a significant portion of the water soluble constituents (e.g., the sugars) will be extracted during the residual lipid extraction step. When the solvent concentration of the alcohol is too dilute (e.g., less than 10%), the effectiveness of the lipid extracting medium is substantially reduced (e.g., protein is extracted and the solubilized flakes absorb an excess amount of the extraction medium).

Defatted soybean flakes saturated with a hydrocarbon as obtained from commercial solvent extraction processes normally contain a substantial amount of water. An excessive amount of water in the residual lipid extraction step should be avoided. Too much water results in a monohydric alcohol-water solvent system which solubilizes the water-soluble constituents and contaminates the extracted lipids. Thus, when a relatively large amount of water is present in the lipid extracting medium, the monohydric alcohol and water functions as miscible co-solvents. For these reasons, the monohydric alcohol to water weight ratio during the residual lipid extraction step should be no less than 2:1. This problem is advantageously obviated by employing defatted soybean flakes containing no more than 15% by weight moisture. Improved results are achieved when the total amount of water present in the extraction medium ranges from about 5% to about 15% by weight of the lipid extraction medium weight.

The removal of residual lipids is an important process step because it properly conditions the soya composition so that the water-soluble constituents can be removed effectively. It has been found that the residual lipids function as a water barrier. Polar solvents such as aqueous mediums cannot readily penetrate this barrier and solubilize the soya compositions water-soluble constituents. Similarly a hydrocarbon solvent by itself cannot effectively remove the residual lipids. However, the monohydric alcohol and hydrocarbon lipid extracting medium employed herein is highly effective in removing the residual lipids.

The lipid extraction step can be accomplished employing conventional extraction processing techniques and apparatus (e.g., batch or continuous co-current or counter-current extraction systems). The lipid extraction medium containing the lipid extracts (i.e., lipid miscella) can be separated from the resultant soya composition by conventional means (i.e., draining, decantation, centrifugation, distillation, air or vacuum drying, etc.). Illustrative suitable apparatus for the lipid extraction step include batch-type extractors, basket-type extractors (e.g., a "Bollman" extractor), vertical U-type extractors, inclined screw conveyor type of extractors, drag chain extractors and the like.

The total lipid content of defatted soya compositions cannot be accurately ascertained by the industry adopted standard exhaustive hexane extraction test, AOCS, Method AC 3–44. Pursuant to such an assay, most conventional defatted soybean flakes normally indicate a residual lipid content of about 0.5 to about 1.5% by weight. However in practicing the invention, recoverable residual lipid yields of about 2 to 3% from defatted soybean flakes are commonly experienced notwithstanding a prior exhaustive hexane extraction assay of about 0.5% lipids. A subsequent assay of the resultant flakes after such an extraction of residual lipids will still indicate a residual lipid content of about 0.5% of its total weight. It has been experienced that residual lipids well in excess of 0.5% are recoverable by subsequent extraction thereof with the hexane/monohydric alcohol medium (frequent yields in excess of 1.0% even though the assay indicates a residual lipid content of only about 0.5% by weight).

From the aforementioned, it is apparent that the total residual lipid content of defatted soya compositions is considerably higher than that ascertained by conventional extractive hexane solvent exhaustive analytical tests. From assay tests of defatted soybean flakes submitted to the lipid extraction medium employed in the present invention, the residual lipids still remaining in the flakes are apparently properly conditioned to permit a more effective removal therefrom by the hexane employed in the exhaustive extractive test. Although it is possible to employ more than one lipid extraction step in the present process, it has been found that the initial lipid extraction step effectively removes the beany constituents of the defatted flakes while still enhancing both the processing and the properties of the resultant recoverable soya compositions therefrom.

In practicing the residual lipid extraction step of the present invention, the residual lipid extraction step should be conducted under appropriate processing conditions such that the amount of recovered lipids is at least equal (on a weight basis) to the total lipid content as assayed by the standard exhaustive hexane extraction test of the initial defatted soya composition. Improved overall processing efficiency as well as increased yields of residual lipids, water soluble constituents, and protein concentrates is accomplished when at least a two-fold recovery (i.e., based on the apparent assay per the standard exhaustive hexane-solvent extraction test) of residual lipids is accomplished by the residual lipid extraction step. The characteristics of the recoverable residual lipids and protein concentrates along with improved processing efficiency and yields are effectuated when the total amount of residual lipids extracted ranges from about 3 to about 6 times the apparent residual lipid content of the initial soya composition as ascertained by the standard exhaustive hexane-solvent extraction test.

After removing residual lipids from the soya composition, the resultant soya composition is submitted to an extraction whereby at least a major portion of the water soluble constituents are extracted therefrom (e.g., sufficient water-soluble constituents are removed to provide a protein- enriched material, containing on a solids weight basis 60% or more protein). Since the extraction of water soluble constituents necessitates the use of water and alcohol as a solvent, it is advantageous to employ as a source material the soya composition saturated with the residual lipid extraction medium as obtained from the residual lipid extraction step. The soya composition submitted to the water-soluble extraction step, however, should be substantially free from the hydrocarbon utilized in the residual lipid extraction step. It has been found that excessive amounts of hydrocarbon solvent will tend to form an emulsion, as well as reducing the effectiveness and yields of recoverable water-soluble constituents from the soya composition. A solvent-saturated soya composition (e.g., after the residual lipid extraction step) will hold and retain (after excess solvent has been removed) from about 80% to about 120% its solids weight in solvent (usually about an equal part by weight). In general, suitable soya compositions for processing to remove the water soluble constituents advantageously contain no more than 5% by weight hydrocarbon solvent on a solids weight basis. Thus prior to removal of water-soluble constituents, the hydrocarbon solvent in the soya compositions may be selectively removed by conventional means such as a flash desolventizer operated under conditions whereby the hydrocarbon is selectively volatized off. In the water-soluble constituent extraction step it is advantageous to employ soya compositions containing no more than 2% by weight hydrocarbon and preferably less than 1% by weight hydrocarbon solvent and most preferably to trace amounts (e.g., not more than 0.1%).

The water-soluble constituents are extracted with an aqueous extracting medium comprised of water and monohydric alcohol with the amount of alcohol being at least 40% but less than 70% of the total monohydric alcohol and water weight. In the extraction of the water soluble constituents, about 150 to about 300 parts by weight aqueous extraction medium is employed for each 100 parts by weight of original full fat flakes. In the water-soluble constituent extraction step, the concentration of monohydric alcohol should be not less than 40% by weight and up to 70% by weight of the total aqueous monohydric alcohol extraction medium weight. If the concentration is less than 40% by weight monohydric alcohol, the protein is solubilized (reducing protein yields) along with a significant reduction in extraction efficiency (e.g., more solvent medium is required due to absorptive character of the soya composition). An excessive amount of alcohol will significantly reduce the solubility of the water constituents which in turn necessitates a higher ratio of extractive solvents to solids to effectively remove the water soluble constituents therefrom.

Suitable monohydric alcohols include those employable in the lipid extraction medium. Increased overall processing efficiency as well as superior resultant products are obtained when ethanol is employed. In addition to the monohydric alcohol and water solvents, other water-miscible organic solvents or solvent aids such as acetic acid, acetone, dioxane, and the like can be used to facilitate extraction of the water-soluble constituents.

The aqueous extraction and separation can be carried out with conventional equipment and processes such as employed in the residual lipid extraction step above, but slurry extraction methods are advantageously employed. Significantly improved soya protein concentrates are obtained by employing an aqueous medium having a monohydric alcohol-to-water weight ratio of about 9:11 to 11:9 by weight while maintaining a solvent to solids weight ratio of about 7:4 to about 10:4 while conducting the water-soluble extraction step under conditions sufficient to provide a product having a protein content ranging from about 65% to about 85% of its solid weight. Internal solvent to solid ratios are suitably maintained sufficiently high by internal recycling of the aqueous miscella. Superior proteinaceous concentrates are obtained when the solvent to solid ratio (based upon the full fat flake weight) is about 2:1 and substantially all (95% by weight or more) of the residual water-soluble constituents are solubilized and extracted from the residual soya composition with the resultant soya composition having a protein content of about 70% to about 76% of its total weight.

The aqueous miscella obtained from the water-soluble constituent extraction step contains di-, tri-, and tetrasaccharides (e.g., sugars such as stachyose, raffinose and sucrose), gluosides (e.g., the phytosterols such as sterol glucosides, the saponins and isoflavone glucosides), organic phosphorus compounds (for example phytin), organic acids and the like. For most effective recovery, this aqueous miscella is then combined with the lipid miscella and processed as more fully described later herein.

The residual soya protein concentrate is then sent to a finishing operation where it is desolventized, dried and converted to a stable form. Comparatively, the resultant soya protein concentrate possesses several unique and advantageous properties over conventional defatted soybean flakes. As a result, the soya protein concentrate obviates most of the major problems heretofore limiting the potential usefulness of defatted soybean flakes. Its protein content on a solids weight basis generally ranges from about 65% to about 85% with the remaining portion thereof consisting primarily of fiber including high molecular weight polysaccharide. Due to the relatively mild processing conditions, essentially none of the protein has been heat denatured. Since the processing steps herein maintain the soya protein in a relatively immobile state (e.g., the monohydric alcohol suppresses solubilization of the protein), the amount of water-soluble proteins extracted therefrom is relatively low (e.g., less than about 3% of the total soybean nitrogen is solubilized). Because the extraction process steps effectively remove the adverse odors and flavoring components (e.g., its bitter and "beany" taste components), the protein concentrate possesses a substantially bland taste. Additional properties, inter alia, include a uniform and relatively rapid hydration rate, improved solubility, gel formation and whipping properties, as well as an improved color. The protein concentrates are particularly suitable as an intermediate in preparing fibrous soya proteins such as those used in synthetic meat analogs. The protein concentrates may be directly employed as a replacement in conventional defatted soybean meals in the preparation of dry expanded extrudates (commonly known to the art as texturized vegetable proteins). Unlike the defatted soybean meals which contain lipid and water soluble contaminants that cannot be effectively eliminated or masked, texturized vegetable proteins prepared from the protein concentrates herein possess the appropriate organoleptic properties essential for a satisfactory meat analog. The soya protein concentrates may be combined with other functional food additives (e.g., coloring, flavoring, emulsifying agents, etc.) and used as a supplement or as a replacement for presently available proteinaceous materials. The protein concentrates are also useful as an intermediate in preparing protein compositions such as hydrolysed soya proteins and protein isolates (e.g., having more than 90% protein), and the like.

Recovery of a high lecithin oil is achieved by thoroughly admixing the lipid miscella and aqueous miscella from the above mentioned extraction steps and effectuating a two-phase separation from the resultant admixture. The phases are a relatively polar and a relatively non-polar phase. In order to effectively separate and recover a high grade lecithin from the resultant admixture, it is essential that the monohydric alcohol be greater than 40% and less than 70% of the admixture polar phase weight. When the monohydric alcohol concentration is less than 40%, the resultant admixture will form an emulsion instead of separating into distinct and separable phases. If the concentration of monohydric alcohol is in excess of 70%, the soybean oil lecithin and monohydric alcohol will not fractionate properly. As a result substantial amounts of lecithin and monohydric alcohol will be found in both the polar and non-polar phases. Greater effectiveness in accomplishing the two-phase separation as well as effectuating a more complete separation of the lipid and water-soluble residual constituents of the soya compositions is accomplished when the proportion of alcohol provided in the mixed phases ranges from 45% to 65% by weight, of the polar phase with 50% preferred. If the total amount of combined alcohol from the lipid miscella and aqueous miscella is outside this range, the appropriate alcohol content should be adjusted prior to admixing.

After thoroughly admixing, a two-phase separation of the resultant admixture can be achieved by gravitation (e.g., batch or continuous separation by centrifugation or merely allowing it to remain in a quiescent state with decantation). Under gravitational conditions, the entire admixture separates into two phases. The upper non-polar phase consists essentially of the components of a high lecithin-containing oil and hexane. The aqueous or polar phase contains substantially all of the soybean seed constituents soluble in the water-monohydric alcohol solvent system. The monohydric alcohol migrates to the aqueous phase. A significant proportion of the fatty residues responsible for a harsh, "beany" flavor will also be carried along with the alcohol into the aqueous phase. Lecithin and the triglycerides are extracted from the admixture and carried into the non-polar phase by the hydrocarbon solvent.

The polar phase and non-polar phase are suitably separated from one another by conventional means such as a solvent decanter tank, a batch or continuous centrifuge, etc. If the non-polar phase contains a substantial amount of fatty residues, these residues can be removed effectively by effectuating another polar and non-polar phase separation employing a monohydric alcohol/water extraction medium substantially free from water solubles. When the non-polar phase has been purified to the desired extent, the residual high-lecithin oil is recovered by conventional means (e.g., desolventized by distillation). The recovered non-polar solvent is recycled for use whenever required (e.g., as solvent in defatting full fat soybean flakes or added to the lipid extraction medium to remove residual lipids from the defatted flakes). The oil can be further fractionated in a conventional manner (e.g., hydration or de-gumming) to yield oil and lecithin fractions thereof. The soybean water-solubles contained in the polar phase are concentrated and recovered in a useful form with the recovered alcohol and/or water being recycled to the process whenever needed.

FIGS. 1 and 2 depict a schematic flow diagram of an integrated and continuous process employing ethanol/hexane and ethanol/water as extractive mediums in practicing the invention. In FIG. 1, whole soybeans 1 are dehulled 2 with the hulls 3 being separated from the dehulled soybean seeds 4. The dehulled soybean seeds 4 are then subjected to a conventional flaking 5 to provide full fat flakes 6. The resultant full fat flakes 6 containing the water-soluble and lipid constituents of the native dehulled bean are then subjected to a conventional hexane solvent extraction step 7 whereby from about 90% to 95% of the lipids are removed from the flakes with the oil 8 being recovered by conventional means. The resultant defatted flakes 9 saturated with hexane or the hexane miscella (e.g., hexane content normally less than 70% by weight of the solids weight) are treated with ethanol 10 to wet the flakes and displace the hexane and the lipids. The flakes saturated with ethanol 11 are then subjected to an ethanol/hexane extraction process 12 whereby substantially all of the residual lipids are removed from the defatted flakes. The resultant lipid miscella 13 composed of the hexane/ethanol solvent and extracted residual lipids is then separated from the soybean flakes substantially free from lipids 14. The separated lipid miscella 13 is then retained for further processing which is more fully described later.

As indicated in FIG. 1, the flakes substantially free of residual lipids but saturated with hexane and ethanol 14 are subjected to hexane removal step 15 (e.g., distillation) whereby the hexane is selectively removed from the flakes with recovered hexane 16 being recycled wherever it is needed. The resultant soybean flakes substantially free from residual lipids and hexane 17 are then submitted to an ethanol/water extraction step 18. In the ethanol/water extraction step 18, substantially all of the water-soluble constituents are removed from the soybean flakes. The resultant aqueous miscella 19 (i.e., ethanol/water solvent and extracts therefrom) are separated from the insoluble solids to provide flakes substantially free from both lipid and water-soluble constituents 20. The flakes substantially free from water soluble constitutes 20 are desolventized 21 to provide a protein flake concentrate 22 comprised essentially of soya protein and including the high molecular weight polysaccharide fibers. The ethanol and water 23 recovered from desolventizing of the insoluble solids 20 is distilled 24 with the resultant recovered ethanol 25 and water 26 being internally recycled and used as an extracting solvent in the process wherever required.

Pursuant to FIG. 1, the lipid miscella 13 and aqueous miscella 19 respectively obtained from the residual lipid extraction step 12 and water-soluble constituent extraction step 18 are then thoroughly mixed 27 with one another to provide a uniform admixture 28 thereof. The admixture of lipid and aqueous miscella is then allowed to separate by gravity into two-distinct phases. One phase, a non-polar phase consists essentially of hexane and the lipid components of a high lecithin oil. The polar phase contains substantially all of the soybean flake water-soluble constituents along with the water and ethanol solvent. As indicated by line (b) of FIG. 2 which is a continuation of line (b) of FIG. 1, the two phases of the admixture after phase separation are partitioned 29 from one another to provide a lipid phase 30 and an aqueous phase 34. The extracted lipids in the lipid phase 30 may be desolventized 31 to remove the hexane 32 therefrom to provide an oil 33. Oil 33 may be subjected to further treatment or purified (e.g., by further extraction with an ethanol/water) to provide a high lecithin containing oil. The hexane recovered from the lipid phase (typically by evaporation and condensation) is then recycled and may be employed again as an extraction solvent wherever needed as indicated by line (a) of FIGS. 1 and 2 (e.g., in the conventional hexane extraction step or the ethanol/hexane extraction step). The resultant aqueous phase 34 is desolventized 35 to provide a water soluble concentrate 36. The recovered water and alcohol (and/or water) can be recycled into the process wherever the alcohol and/or water is required. Alternatively, as indicated by FIG. 2, the water and ethanol 37 is distilled 38 with the recovered ethanol 39 and water 40 being internally recycled as respectively indicated by lines (d) and (c) of FIGS. 1 and 2.

As mentioned previously, the process of the present invention is most suitably integrated and employed in conjunction with conventional hydrocarbon solvent extraction processing of full fat flakes. Accordingly, the solvent to solids ratios of the above disclosure and appendant claims in both the extracting of residual lipids from the vegetable seed and water-soluble constituents contained in residual vegetable seed material are based upon the solids weight of the dehulled seed material prior to removal of any lipid or water soluble constituents therefrom. For example, when soybean flakes are subjected to the extractions of residual lipid and water soluble constituents, the extraction medium and solids balances herein for both the residual lipid and water soluble constituent extraction steps are based upon weight of full fat flakes initially submitted to a conventional solvent extraction process (e.g., a conventional hexane extraction process to provide defatted flakes) rather than the actual solids weight of substance in the residual lipid or water-soluble constituents extraction mediums.

The following example is illustrative of the invention:

EXAMPLE

Employing a six-stage countercurrent treatment, a bland, soya protein concentrate having a protein content of 74% by dry solids weight was prepared. The first three countercurrent stages were employed to extract residual lipids from "defatted" soybean flakes saturated with hexane. The latter three stages were utilized to extract the water-soluble constituents. To the first countercurrent stage, there was admitted soybean flakes saturated with hexane wherein excess hexane solvent employed in a conventional solvent extraction process had been drained from the flakes. The drained soybean flakes saturated with hexane contained 56% by weight dry solids, 8.5% by weight water and 32.5% by weight hexane. On a dry solids weight basis, the soybean flakes were comprised of about 0.6% residual lipids and 57% protein.

The three countercurrent equilibrated slurries of stages 1, 2 and 3 were maintained at 120° F. with a total residual lipid extraction solvent medium to dry solids weight ratio at about 5:1 (i.e., about 4:1 on full fat flake weight). Including the hexane and water from the saturated flakes plus additional water of the 180 proof ethanol employed, each of the first three equilibrated countercurrent stages had a residual lipid solvent extraction medium comprised on a weight basis of about 64% hexane, 26% ethanol and 10% water. The first three stages were slurried for about 20 minutes with the resultant equilibrated flakes from stages 1 and 2 being separated from the residual lipid extraction solvent by means of perforated basket centrifuge operated at 2,000 G's. A portion of the full miscella containing the extracted residual lipids was recovered from the first stage and placed in decanter flasks for further processing with the aqueous miscella from stage 4.

The intermediate miscella obtained from the second and third stages were forwarded and recycled for use as a residual lipid extraction solvent in the first and second stages and to maintain an appropriate solvent level for each stage. The centrifuged cakes from stages 1 and 2 were transferred respectively to equilibrated stages 2 and 3. The net solvent usage in extracting the residual lipids was 1.8 parts by weight of residual lipid extraction solvent for each part by weight of dry solids admitted to the first stage. Thus, for each part by weight of dry solids admitted to the first stage, 1.8 parts by weight of fresh solvent comprised (on a weight basis) of a 64% hexane, 26% ethanol and 10% water was introduced to the third stage.

After submitting the soya composition to the third stage and completion of the equilibration thereof, excess residual lipid solvent extraction medium was drained from the resultant solid soya composition. The resultant drained soya material (approximately comprised on a total weight basis of 50% dry solids, 27% hexane, 14% ethanol and 9% water) was then subjected to a desolventization process whereby all of the hexane was removed. The resultant desolventized soya material, free of hexane removed, contained approximately on a total weight basis, 74% dry solids, 16% ethanol and 10% water. The water soluble constituents were removed by forwarding the soya composition (free of hexane) to the next three equilibrated countercurrent aqueous ethanol extraction stages. Each slurry stage was maintained at about 6.75 parts by weight solvent for each part by weight dry solids and at a temperature of 120° F. After twenty minutes of slurrying for each stage, the equilibrated soya compositions were separated by means of a perforated basket type centrifuge operated at 2,000 G's. A portion of the full aqueous ethanol miscella from the fourth equilibrated stage was recovered for processing with the residual lipid miscella from stage 1. As in the above residual lipid extraction stages, the intermediate miscella from stages 5 and 6 were forwarded and recycled for use in stages 4 and 5 and to maintain the appropriate solvent level for each stage. Recovered centrifuged cakes from stages 4 and 5 were respectively forwarded to stages 5 and 6. Fresh solvent having a 1:1 weight ratio of ethanol and alcohol was introduced into the sixth stage at a rate of about 2.7 parts by weight fresh solvent for each part by weight of dry solids admitted to the first stage.

The centrifuged cake recovered from the sixth stage was comprised (on a weight basis) of 40% dry solids, 30% ethanol and 30% water. The water and ethanol was removed from the centrifuged cake by steam stripping. The resultant desolventized product was ground into a meal. Its assay was 91% by weight dry solids of which 74% by weight was protein.

About 6.2 parts by weight of the full residual lipid miscella recovered from stage 1 containing on a weight basis of 2.75% dry solids, 70.50% hexane, 23.25% ethanol and 3.50% water was combined with 4.1 parts by weight of the full aqueous ethanol miscella from stage 4. The full aqueous ethanol miscella from stage 4 was comprised on a total weight basis of about 46% ethanol, 43% water and 11% dry solids. The combined full residual lipid miscella and aqueous ethanol miscella were then vigorously agitated together to provide a homogeneous admixture. The resultant admixture was then allowed to stand for five minutes in a decanter flask whereupon the admixture separated into two distinct phases. The upper non-polar phase was separated and upon analysis found to be comprised on a total weight basis of about 93% hexane, 2.85% lipids, 2.42% ethanol and 1.73% water. An oil of a high lecithin content, 40% acetone insoluble, was recovered by evaporation steam stripping. Based upon the total amount of dry solids submitted in the first stage, the recovered oil represents 2.6% of its weight.

The dry solids were recovered from the lower polar phase by evaporating off the excess solvent. Recovered solids represented 13.6% by weight of the total dry weight of soybean flakes submitted to the first stage with the recovered solids being primarily comprised of sugars.

Since many embodiments may be made of this invention and since many changes may be made in the embodiments described, the foregoing is to be interpreted as illustrative only and the invention is defined by the claims appended hereafter.

What is claimed is:

1. A process for removing water-soluble and lipid constituents from solvent-extracted vegetable seed materials containing residual lipids wherein the seed material is characterized as containing on a dry weight basis from about 25% to about 40% water-soluble constituents, a lipid content from about 0.5% to about 10% (as determined by the American Oil Chemical Society—Official Method AC–3–44) with the remaining portion thereof being primarily protein and a minor amount of fiber, and thereby providing vegetable seed protein concentrates therefrom, said process comprising:
   (A) extracting residual lipid constituents from solvent-extracted vegetable seed material by subjecting the seed material to a lipid extraction medium containing a hydrocarbon solvent and from about 2 to about 30 parts by weight monohydric alcohol for each 80 parts by weight hydrocarbon solvent, said extraction of residual lipids being conducted under conditions whereby the amount of alcohol is maintained at a level of at least 2% to about 40% by weight of the vegetable seed material dry weight, the monohydric alcohol to water ratio is no less than 2:1 and the amount of residual lipid constituents extracted from the seed material is at least equal to the AC–3–44 lipid content of the solvent-extracted vegetable seed material prior to the extraction of the residual lipids therefrom;
   (B) separating the resultant lipid miscella from the residual vegetable seed material;
   (C) extracting at least a major portion of the non-proteinaceous, water-soluble constituents contained in the residual vegetable seed material by subjecting 100 parts by weight of the vegetable seed material to about 150 to about 300 parts by weight aqueous extraction medium containing from about 40% to about 70% by weight aliphatic monohydric alcohol; and
   (D) separating the resultant aqueous miscella from the seed material and thereby providing a vegetable seed protein concentrate.

2. The process according to claim 1 wherein the vegetable seed material is a soybean particulate having a protein concentration of at least 30% of the particulate dry weight.

3. The process according to claim 2 wherein the soybean particulate material is soybean flakes essentially saturated with a hydrocarbon solvent.

4. The process according to claim 3 wherein the soybean flakes are treated with a monohydric alcohol prior to the extraction of residual lipids therefrom.

5. The process according to claim 4 wherein ethanol is employed as a monohydric alcohol and the hydrocarbon is hexane.

6. The process according to claim 5 wherein the extraction of water-soluble constituents is conducted under conditions sufficient to provide a vegetable seed protein concentrate having on a solids weight basis from about 65 to about 80% by weight protein.

7. The process according to claim 6 wherein after the extraction of residual lipids from the soybean flakes, but prior to the extraction of water-soluble constituents, soybean flakes saturated with ethanol and hexane are subjected to processing conditions whereby substantially all of the hexane is selectively removed from the soybean flakes.

8. The process according to claim 7 wherein a sufficient amount of water-soluble constituents and residual lipids are removed from the soybean flakes to provide an enriched protein product having on a solids weight basis at least about 70% protein.

9. The process according to claim 1 in which (a) the lipid miscella is mixed with the aqueous miscella to provide an admixture thereof and a phase separation of the resultant admixture is effected to provide a non-polar phase containing lipid extract and a polar phase containing water-soluble extract, the admixture containing sufficient monohydric alcohol to yield a polar phase containing on a total weight basis about 40% to about 70% by weight monohydric alcohol; (b) the non-polar phase is partitioned from the polar phase; and (c) a lipid concentrate is recovered from the non-polar phase.

10. The process according to claim 9 wherein the monohydric alcohol is ethanol and the hydrocarbon is hexane.

11. The process according to claim 10 wherein the vegetable seed material subjected to the extraction step of residual lipids is soybean seed particulates having a protein concentration of about 50% to about 60% of its dry weight and the residual lipids assay thereof as determined by the American Oil Chemists Society—Official Method AC–3–44 ranges from about 0.5% to about 1.5%.

12. The process according to claim 10 wherein the soybean particulates are soybean seed flakes substantially saturated with a hexane solvent and the hexane-saturated flakes are subsequently treated with ethanol prior to the extraction of residual lipids therefrom.

13. The process according to claim 12 wherein the lipid extraction medium is comprised of about 8 to about 25 parts by weight ethanol with the extraction of residual lipids being conducted under conditions whereby the ethanol concentration is maintained at a level of at least 5 to about 25% of the total dry weight of the soybean flakes.

14. The process according to claim 13 wherein the amount of residual lipids recovered from the soybean seed particulates is at least equal to the residual lipid assay thereof.

15. The process according to claim 12 wherein a sufficient amount of water soluble constituents and residual lipids are removed from the soybean flakes to provide an enriched protein product having on a solids weight basis from about 65% to about 80% protein.

16. The process according to claim 15 wherein the water-solubles extraction medium is comprised of an ethanol-to-water weight ratio of about 9:11 to about 11:9 and the solvent-to-solids weight ratio ranges from about 7:4 to about 10:4.

17. The process according to claim 16 wherein a sufficient amount of water-soluble constituents and residual lipids are removed from the soybean flakes to provide an enriched protein product having on a solids weight basis at least about 70% protein.

18. The process according to claim 1 wherein the monohydric alcohol is ethanol and the hydrocarbon is hexane.

19. The process according to claim 18 wherein the vegetable seed material subjected to the extraction step of residual lipids is soybean seed particulates having a protein concentration of about 50% to about 60% of its dry weight and the residual lipids assay thereof as determined by the American Oil Chemists Society—Official Method AC–3–44 ranges from about 0.5% to about 1.5%.

20. The process according to claim 19 wherein the soybean particulates are soybean seed flakes substantially saturated with a hexane solvent and the hexane-saturated flakes are subsequently treated with ethanol prior to the extraction of residual lipids therefrom.

21. The process according to claim 20 wherein the lipid extraction medium is comprised of about 8 to about 25 parts by weight ethanol with the extraction of residual lipids being conducted under conditions whereby the ethanol concentration is maintained at a level of at least 5 to about 25% of the total dry weight of the soybean flakes.

22. The process according to claim 21 wherein the amount of residual lipid constituents extracted from the seed material is at least two times greater than the AC–3–44 lipid content of the solvent-extracted vegetable seed material prior to extraction of resultant lipids therefrom.

23. The process according to claim 19 wherein a sufficient amount of water soluble constituents and residual lipids are removed from the soybean flakes to provide an enriched protein product having on a solids weight basis from about 65% to about 80% protein.

24. The process according to claim 23 wherein the water-solubles extraction medium is comprised of an ethanol-to-water weight ratio of about 9:11 to about 11:9 and the solvent-to-solids weight ratio ranges from about 7:4 to about 10:4.

25. The process according to claim 24 wherein a sufficient amount of water-soluble constituents and residual lipids are removed from the soybean flakes to provide an enriched protein product having on a solids weight basis at least about 70% protein.

References Cited

UNITED STATES PATENTS

| | | | |
|---|---|---|---|
| 2,278,670 | 4/1942 | Rauer | 260—123.5 |
| 2,444,241 | 6/1948 | Beckel et al. | 260—123.5 X |
| 2,495,706 | 1/1950 | DeVoss et al. | 260—123.5 UX |
| 2,635,094 | 4/1953 | Belter et al. | 260—123.5 |
| 3,168,406 | 2/1965 | Moshy | 99—17 X |
| 3,207,744 | 9/1965 | O'Hara et al. | 260—123.5 |
| 3,268,503 | 8/1966 | Mustakas et al. | 260—123.5 |
| 3,365,440 | 1/1968 | Circle et al. | 260—123.5 |

FOREIGN PATENTS

| | | | |
|---|---|---|---|
| 609,018 | 9/1948 | Great Britain | 260—123.5 |

OTHER REFERENCES

Kogyo-Kwagaku-Zasshi, vol. 32, 1929, Mashino, pp. 312B–313B.

Kogyo-Kwagaku-Zasshi, vol. 33, 1930, Mashino, pp. 55B–56B.

J. of American Oil Chemists' Society, vol. 37, May 1960, pp. 217–219, Nielsen.

HOWARD E. SCHAIN, Primary Examiner

U.S. Cl. X.R.

99—2 R, 17, 15; 260—412.4